April 18, 1933.  H. E. NICHOLS  1,903,935
BRAKE DUST GUARD
Filed March 3, 1931　　3 Sheets-Sheet 1
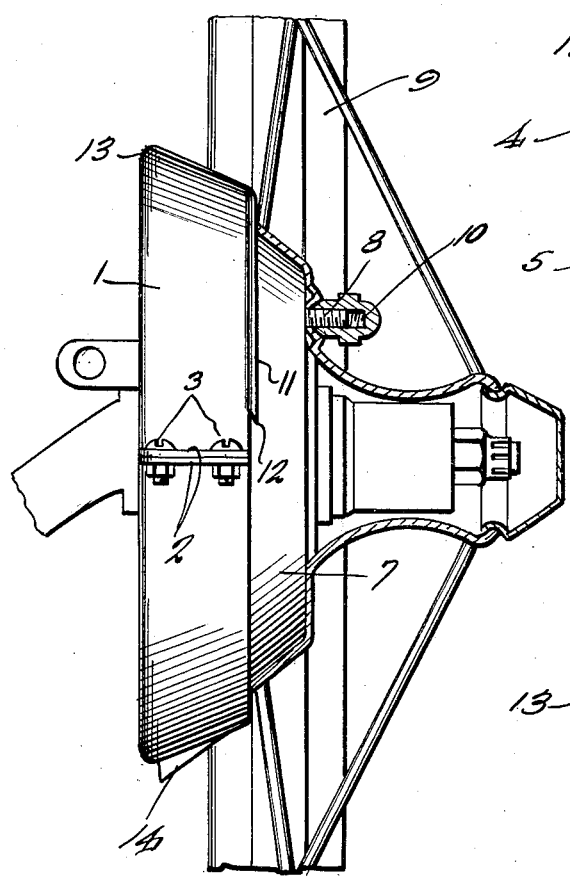
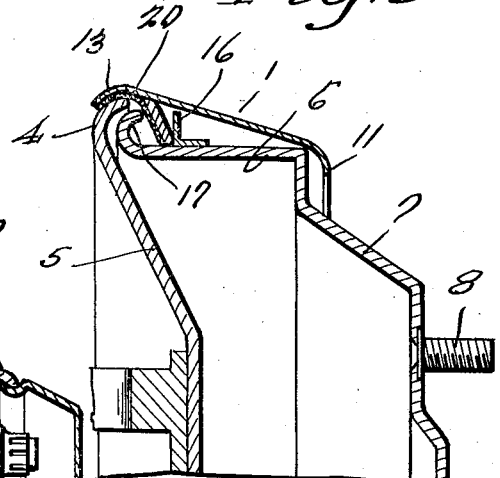
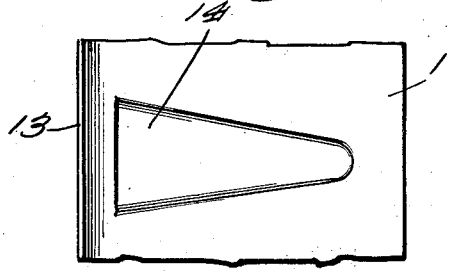
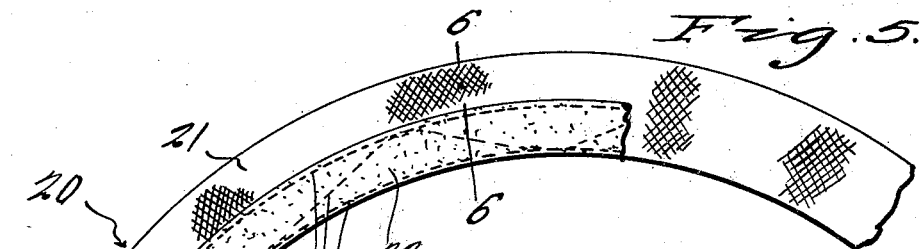
Inventor
Herbert E. Nichols
By Clarence A. O'Brien
Attorney April 18, 1933.  H. E. NICHOLS  1,903,935
BRAKE DUST GUARD
Filed March 3, 1931   3 Sheets-Sheet 2
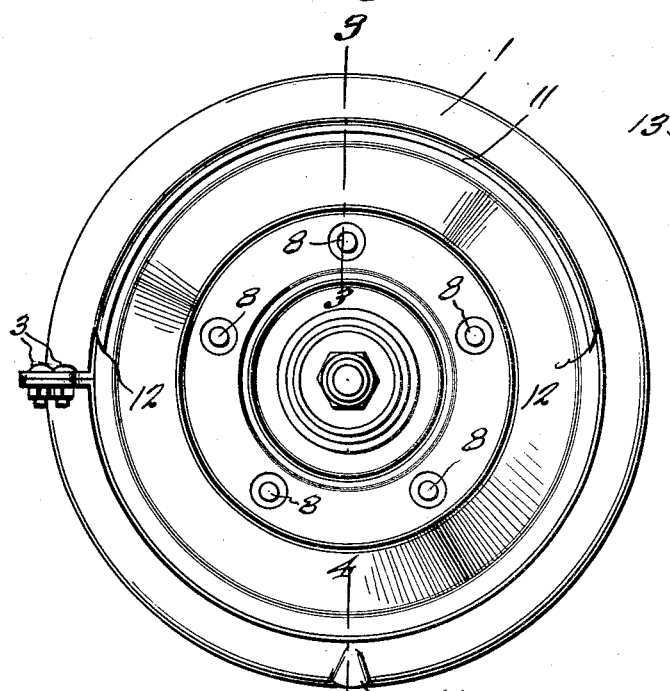
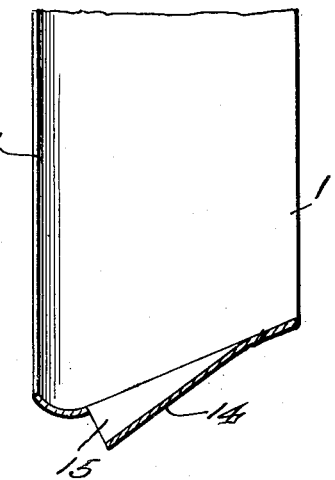
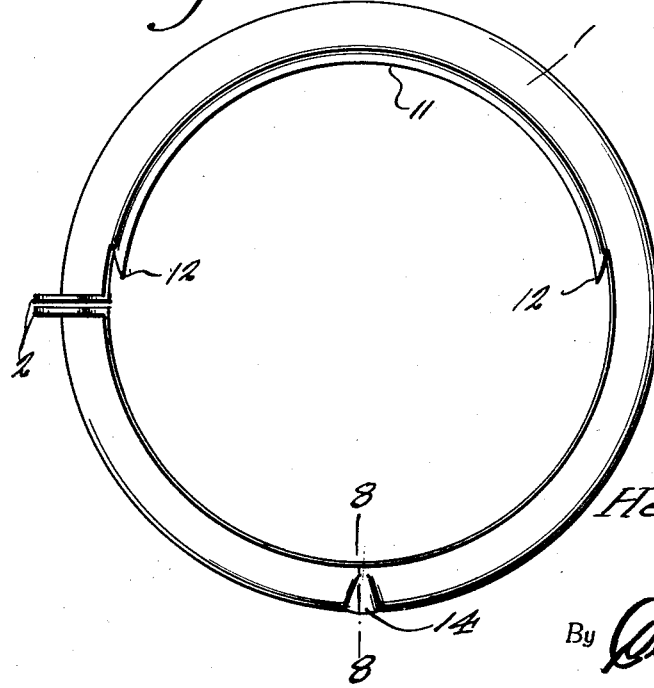
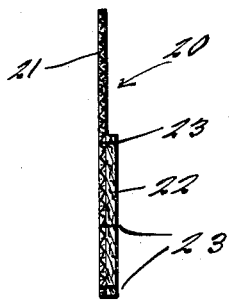
Inventor
Herbert E. Nichols
By Clarence A. O'Brien
Attorney April 18, 1933.  H. E. NICHOLS  1,903,935
BRAKE DUST GUARD
Filed March 3, 1931   3 Sheets-Sheet 3
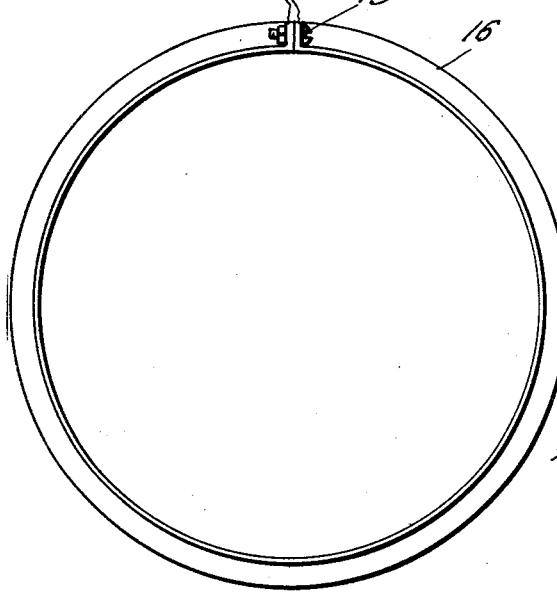
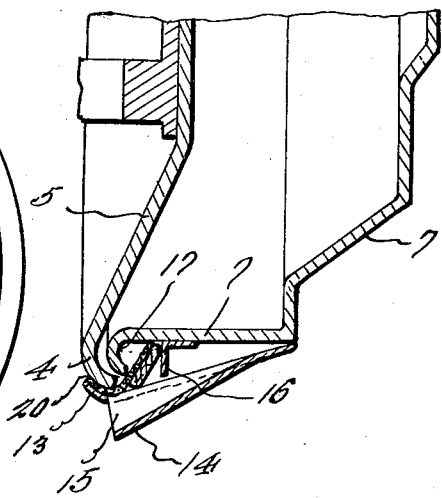
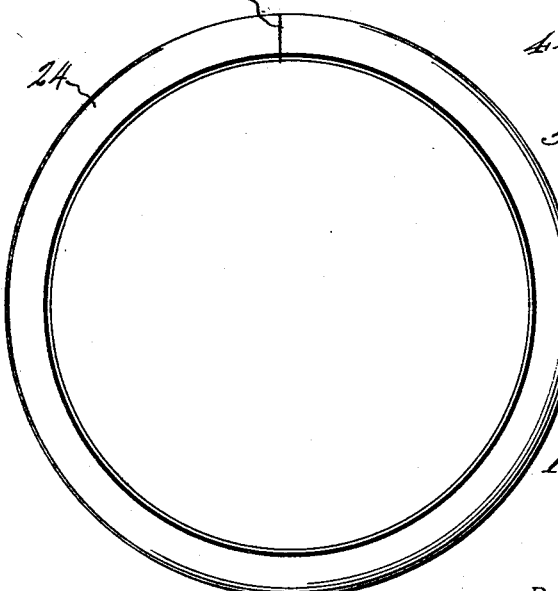
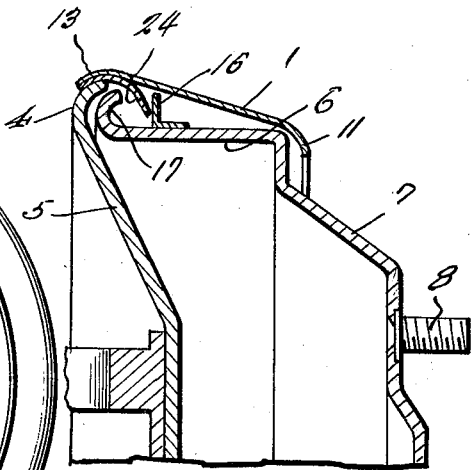
Inventor
Herbert E. Nichols
By Clarence A. O'Brien
Attorney Patented Apr. 18, 1933

1,903,935

UNITED STATES PATENT OFFICE

HERBERT E. NICHOLS, OF SANTA ANA, CALIFORNIA

BRAKE DUST GUARD

Application filed March 3, 1931. Serial No. 519,815.

The present invention relates generally to a dust brake guard of the type illustrated and described in my co-pending application which was filed on December 2, 1929, Serial No. 411,071 and upon which this invention constitutes an improvement.

An important object of the invention is to provide, in a manner as hereinafter set forth, a dust guard for vehicle brakes of the internal expanding type embodying a novel construction and arrangement of parts whereby the same may be expeditiously mounted in operative position on the vehicle brake without the necessity of materially altering said brake structurally and which also may be quickly removed when desired should it be necessary to remove the vehicle brake drum.

Other objects of the invention are to provide a brake dust guard of the aforementioned character which will be simple in construction, strong, durable, efficient and reliable in use, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in front elevation showing a dust guard in accordance with this invention mounted in position on a brake drum, the exposed portion of said drum being shown in vertical section.

Figure 2 is a view in side elevation of the device looking at same from the outer side thereof.

Figure 3 is a fragmentary view in vertical section taken substantially on the line 3—3 of Figure 2.

Figure 4 is a fragmentary detail view in vertical section taken substantially on the line 4—4 of Figure 2.

Figure 5 is a fragmentary detail view in elevation showing a portion of the flexible sealing ring constituting one of the important elements of the invention.

Figure 6 is a sectional view taken substantially on the line 6—6 of Figure 5.

Figure 7 is a detail view in side elevation showing the band removed from the vehicle brake.

Figure 8 is a sectional view taken substantially on the line 8—8 of Figure 7.

Figure 9 is a fragmentary detail view in top plan showing the drain in the band.

Figure 10 is a detail view in side elevation showing a metallic sealing ring which, if desired, may be used in lieu of the elements shown in Figure 5.

Figure 11 is a view in vertical section showing the device illustrated in Figure 10 in position for use.

Figure 12 is a detail view in side elevation showing the flange which is mounted on the brake drum for rotation therewith.

Referring to the drawings in detail, it will be seen that the reference numeral 1 designates a substantially frusto-conical split metallic band having the opposed apertured ears 2 on its ends for the passage of the clamping elements 3 for removably securing the band on the outwardly curved flange 4 of the backing plate 5 of the brake. The band 1, when in position, is disposed around the cylindrical portion 6 of the brake drum 7 from one side of which the studs 8 project in the usual manner for the purpose of securing the vehicle wheel 9 to the drum through the medium of the nuts 10.

The upper portion of the band 1 has its outer edge provided with an integral depending flange 11 which has its ends terminating in the outwardly directed points 12 to prevent water which drains from the upper portion of the band on the exterior thereof from getting between said upper portion and the cylindrical portion 6 of the drum. This water will flow by gravity to the ends of the flange 11 and will then flow by capillary attraction outwardly to the points 12 and the drum therefrom. The band 1 has its inner marginal portion curved inwardly throughout its circumference, as at 13 to fit the flange 4 of the backing plate 5 of the brake. The lower side of the band 1 has a depression 14 stamped therein providing a drain opening 15 for the passage of water and other foreign matter from the interior of the band 1.

A split metallic ring or flange 16 is mounted on the cylindrical portion 6 of the brake drum 7 in spaced relation to the usual curved flange 17 which is provided on the free edge of the cylindrical portion 6 and which is disposed in opposed relation to the flange 4. The flange 16 is of angle iron cross section and has its ends provided with opposed apertured ears 18 for the passage of the clamping bolt 19. As will be apparent, the flange 16 is mounted for rotation with the drum 7 and has its outer edge disposed in close proximity to the band 1. It will further be seen that the band 1 is also disposed in close proximity to the outer edge of the cylindrical portion 6 of the drum 7.

A sealing ring is designated generally by the reference numeral 20 and, as best seen in Figure 5 of the drawings, comprises a flat annulus 21 of suitable flexible material on the inner portion of the outer side of which is secured by any suitable means, as by stitching, a packing ring of suitable compressible material, such as felt 22. In Figure 5 of the drawings the element 22 is shown stitched, as at 23, to the annulus 21. The outer marginal portion of the annulus 21 which is free of the felt or the like 22 is clamped between the band 1 and the flange 4 of the backing plate 5 upon which the flange 1 is mounted and from this point the annulus 21 and the felt ring 22 extend inwardly toward the periphery of the cylindrical portion 6 of the drum 7 between the flange 16 and the flange 17. It will thus be seen that the sealing ring extends adjacent the free edges of the flanges 4 and 17 of the brake in a manner to close the space therebetween. The free edge of the sealing ring 20 may have wiping contact with the inner side of the flange 16 and the outer periphery of the cylindrical portion of the drum 7.

In Figures 10 and 11 of the drawings the sealing ring is in the form of a resilient, split metallic member 24 of the cross sectional shape illustrated to advantage in Figure 11. The member 24 is split as at 25. The inner marginal portion of the member 24 is curved to conform substantially to the flange 4 of the backing plate 5 and also to the inturned flange portion 13 of the band 1. The member 24 is clamped between the band 1 and the backing plate flange 4 and it will further be seen from a consideration of Figure 11 that the cross sectional shape of the member 24 is such that said member 24 is directed inwardly toward the cylindrical portion 6 of the brake drum and the removable flange 16, the free edge of the member 24 being disposed in close proximity to the inner side of the removable flange 16. As will be obvious, the metallic sealing ring 24 functions in a manner similar to the flexible sealing ring 20 for closing the space between the flanges 4 and 17 of the vehicle brake.

In assembling the dust guard on the vehicle brake the wheel 9 is preferably removed from the drum 7 although this is not necessary. The flange 16 is then mounted in position on the cylindrical portion 6 of the drum 7 and spaced the correct distance from the drum flange 17. Then, either the sealing ring 20 or the sealing ring 24 is disposed in position on the backing plate flange 4 of the frame after which the split band 1 is positioned and clamped by the bolts 3 extending through the apertured ears 2. It will thus be seen that the band 1 constitutes means for clamping either of the sealing rings 20 or 24 in position.

The flange 16 and the sealing ring 20 or 24 constitute means for preventing dirt, water and the like from getting between the flanges 4 and 17 and passing into the brake drum 7. Water which may get between the cylindrical portion of the drum and band 1 will be thrown by centrifugal force outwardly against the band 1 and will then flow by gravity to the bottom of the band from which the water will escape through the trough 14 and the drain opening 15. As before stated, the depending flange 11 is to prevent water which may be draining from the upper side of the band 1 from entering between the upper portion of the band and the brake drum and said water drains from the ends of the flange 11 in a manner to clear the drum 7 through the medium of the outwardly directed points 12.

It is believed that the many advantages of a dust guard in accordance with this invention will be readily understood, and although the preferred embodiment of the invention is as illustrated and described, it is to be understood that changes in the details of construction may be had which will fall within the scope of the invention as claimed.

What is claimed is:—

1. In combination with a brake including a backing plate and a relatively rotatable drum, a band mounted on the backing plate and extending therefrom over the drum, and a flange formed on one edge of the band and overhanging the drum, said flange being formed on an upper portion of the band and having its ends terminating in points spaced from said one edge of the band.

2. In combination with a brake including a backing plate and a relatively rotatable drum including a cylindrical portion, said cylindrical portion and the backing plate having opposed flanges of arcuate cross section on adjacent portions thereof, a split band removably mounted on the flange of the backing plate and extending therefrom over the cylindrical portion of the drum, said band being substantially frusto-conical in shape and encircling the cylindrical portion of the drum, an inwardly curved flange formed integrally on an upper portion of the band on one edge thereof, the last named flange overhanging the drum, said flange being provided with a drain opening in its lower portion.

3. In combination with a brake including a backing plate and a relatively rotatable drum having a cylindrical portion, adjacent portions of the cylindrical portion and the backing plate being provided with opposed flanges, a band mounted on the backing plate flange and extending therefrom over the cylindrical portion of the drum, and a flange fixed on the cylindrical portion of the drum for rotation therewith and having its free edge disposed adjacent the inner periphery of the band.

4. In combination with a brake including a backing plate and a relatively rotatable drum having a cylindrical portion, adjacent portions of the cylindrical portion and the backing plate being provided with opposed flanges, a band mounted on the backing plate flange and extending therefrom over the cylindrical portion of the drum, and a flange fixed on the cylindrical portion of the drum for rotation therewith and having its free edge disposed adjacent the inner periphery of the band, the last named flange being spaced from the flange on the cylindrical portion of the drum, and a sealing ring secured between the band and the backing plate flange and extending therefrom between the third named flange and the flange of the cylindrical portion of the drum.

5. In combination with a brake including a backing plate and a relatively rotatable drum having a cylindrical portion, said cylindrical portion and the backing plate having adjacent portions provided with opposed flanges of arcuate cross section, a flange removably mounted on an intermediate portion of the cylindrical portion of the drum and disposed in spaced, opposed relation to the arcuate flange on said cylindrical portion, a sealing ring mounted on the backing plate flange and extending therefrom between the third named flange and the arcuate flange on the cylindrical portion of the drum, and a substantially frusto-conical split band encircling the cylindrical portion of the drum and mounted for support on the backing plate flange, said band constituting means for securing the ring in position on the backing plate flange.

6. In combination with a brake including a backing plate and a relatively rotatable drum having a cylindrical portion, said cylindrical portion and the backing plate having adjacent portions provided with opposed flanges of arcuate cross section, a flange removably mounted on an intermediate portion of the cylindrical portion of the drum and disposed in spaced, opposed relation to the arcuate flange on said cylindrical portion, a sealing ring mounted on the backing plate flange and extending therefrom between the third named flange and the arcuate flange on the cylindrical portion of the drum, and a substantially frusto-conical split band encircling the cylindrical portion of the drum and mounted for support on the backing plate flange, said band constituting means for securing the ring in position on the backing plate flange, the band having one marginal portion curved inwardly to conform substantially to the curvature of the backing plate flange, a depending flange formed integrally on an upper portion of the other marginal edge of the band.

7. In combination with a brake including a backing plate and a relatively rotatable drum having a cylindrical portion, said cylindrical portion and the backing plate having adjacent portions provided with opposed flanges of arcuate cross section, a flange removably mounted on an intermediate portion of the cylindrical portion of the drum and disposed in spaced, opposed relation to the arcuate flange on said cylindrical portion, a sealing ring mounted on the backing plate flange and extending therefrom between the third named flange and the arcuate flange on the cylindrical portion of the drum, and a substantially frusto-conical split band encircling the cylindrical portion of the drum and mounted for support on the backing plate flange, said band constituting means for securing the ring in position on the backing plate flange, the band having one marginal portion curved inwardly to conform substantially to the curvature of the backing plate flange, a depending flange formed integrally on an upper portion of the other marginal edge of the band, the depending flange having its ends terminating in points spaced from said other marginal edge of the band, said band being still further provided with a drain opening in its lower portion.

In testimony whereof I affix my signature.

HERBERT E. NICHOLS.